Sept. 2, 1958 D. R. HAYTER 2,849,851
APPARATUS FOR CUTTING AND TREATING GRASS
Original Filed Sept. 21, 1953 3 Sheets-Sheet 1
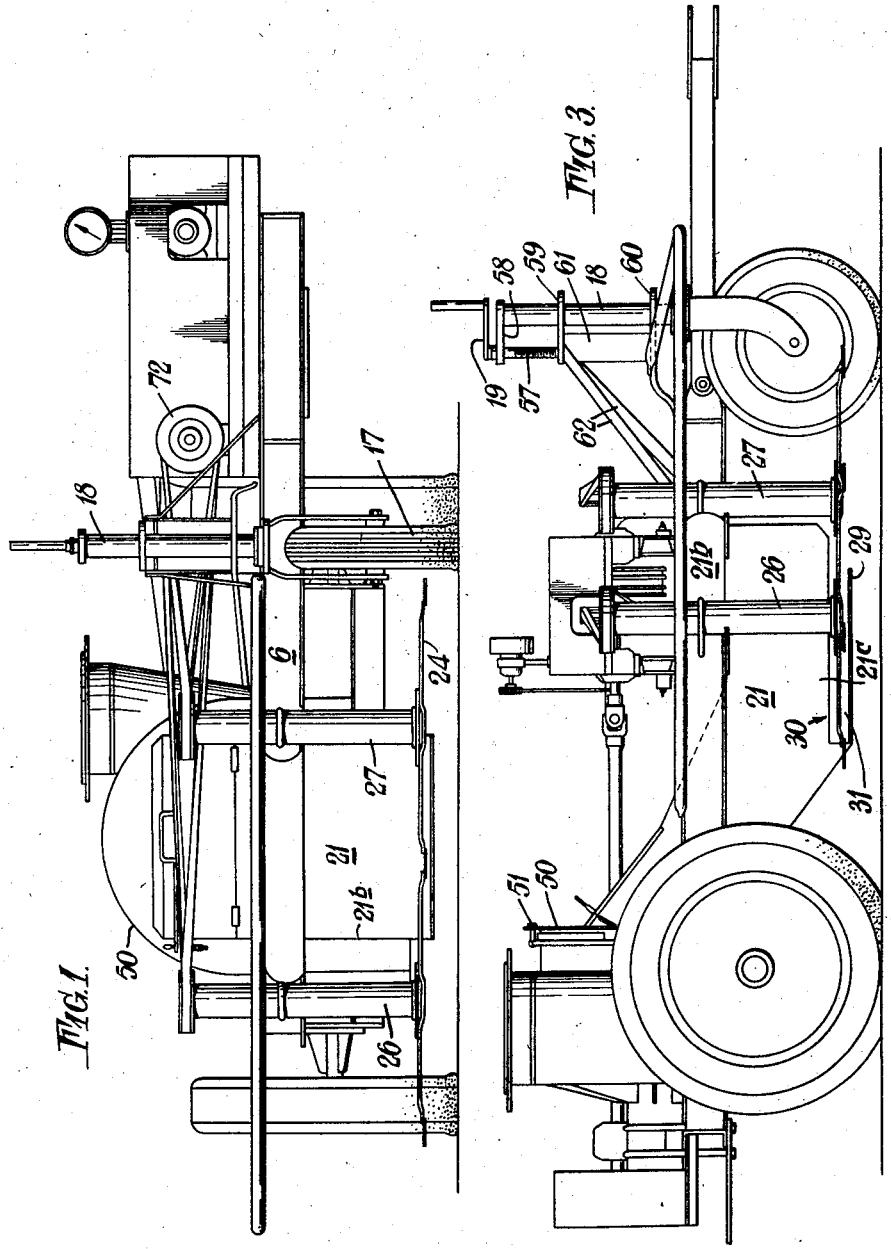
Douglas Richard Hayter
INVENTOR
his Attys

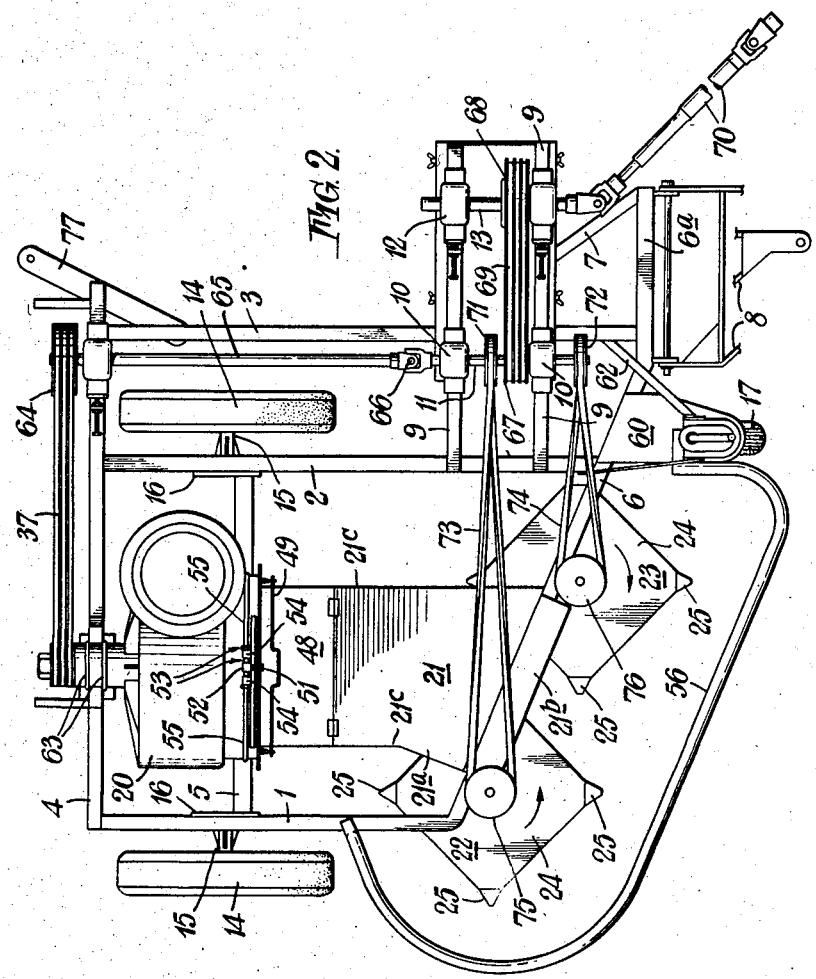

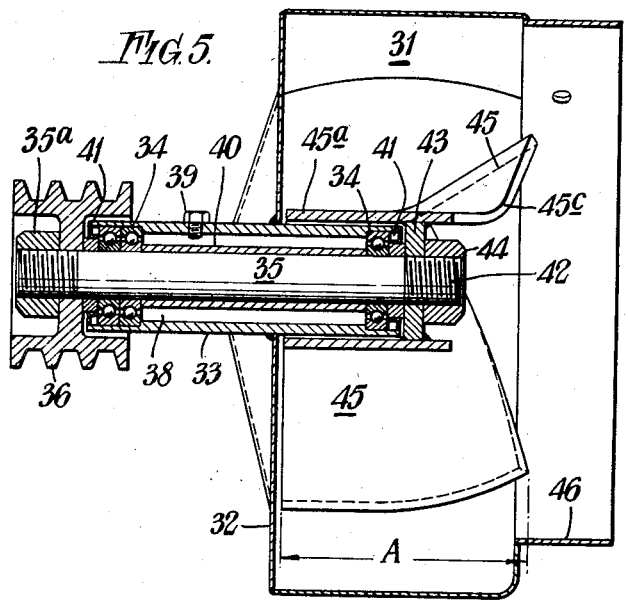
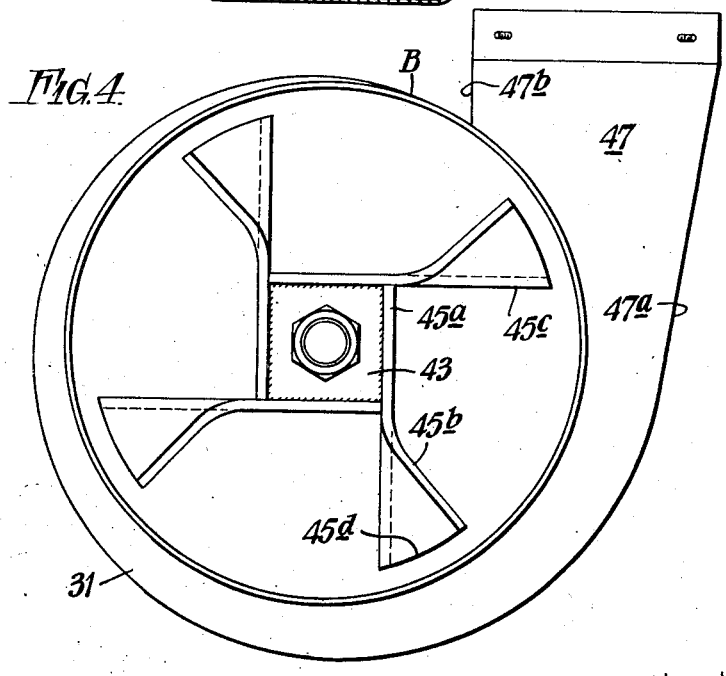

United States Patent Office 2,849,851
Patented Sept. 2, 1958

2,849,851
APPARATUS FOR CUTTING AND TREATING GRASS

Douglas Richard Hayter, Spellbrook, Bishop's Stortford, England, assignor to Pullman Spring-Filled Company Limited, London, England, and Hayters Limited, Spellbrook, Bishop's Stortford, England Continuation of application Serial No. 381,425, September 21, 1953. This application June 19, 1957, Serial No. 667,309

Claims priority, application Great Britain September 26, 1952

10 Claims. (Cl. 56—157)

This invention relates to harvesters for cutting crops close to the ground, e. g. for collecting grass and the like for making silage. The harvester of the present invention in common with others proposed heretofore embodies a mobile machine frame carrying a power driven rotary fan combined with a lacerator or beater in a housing and a conduit leading at one end to the inlet of said housing, and also crop cutting means in juxtaposition to the other or inlet end of said conduit.

This application is a continuation of applicant's copending application, Serial No. 381,425 filed September 21, 1953, now forfeited.

In experiments with previously proposed machines of the foregoing type it has been found that extremely high suction effort is required by the rotary fan if crops are to be cut close to the ground as distinct from merely slicing off the tops of e. g. corn stalks and the like, in order to draw the cut crops into the fan housing and also such high suction effort and the form of cutters employed resulted in a large quantity of earth and other foreign matter being drawn into and discharged from the fan housing thus rendering the cut crop unsuitable for storing for making silage without first removing the foreign matter therefrom which in itself is a tedious and difficult operation as the earth and foreign matter became broken up into fine particles and intimately mixed with the cut grass. Also the form and arrangement of cutters frequently resulted in jamming and breakage thereof and the resistance to the traction of the machine frame over the ground was very high due to the drag of the cutters. The object of the present invention is to obviate the foregoing disadvantages, that is to solve the following problems existing with previously proposed machines of the type in question:

(1) Ease of transport of the harvester.
(2) A high speed of operation with low power consumption.
(3) Avoidance of picking up dirt and harmful foreign bodies.
(4) Avoidance of jamming and breaking of machine parts.
(5) Picking up the lush or soft types of grass cleanly and smoothly.
(6) Ability to negotiate awkward terrain.
(7) Instantaneous adjustment of machine to various forms of crops.
(8) Reasonable production costs.

The manner in which the foregoing problems have been solved will be apparent hereinafter, the present invention being broadly based on the means which makes sure that the form of cutters employed and the zone of cutting relatively to the suction conduit are such as to ensure high speed "clean cutting" of the crop and making sure that before the cut crop can flatten on to the ground it is assisted forthwith into the suction conduit in a form which ensures its easy unobstructed flow into the rotary beater mechanism and also obviates having a high speed air flow at the inlet of the suction conduit. In the latter mentioned connection it should be mentioned that with the conventional reciprocating cutters generally known as sickle cutters which cut the grass by a saw-tooth action the cut grass is simply deposited in a static condition and therefore very high suction is required to induce it into the machine. Also with other forms of cutters in which the cut crop was deposited on to the ground before being sucked into the machine the minimum possible air speed at the inlet has to be some thousands of feet per minute, and this would have to be in the neighbourhood of five to seven thousand feet per minute with the fully grown heavier classes of grass or with moisture laden crops or lush grass. Also large quantities of free soil are drawn into the machine and mixed with the crops.

Having regard to the foregoing problems, the harvester of the present invention comprises a mobile frame, a rotary fan carried by the frame, and a casing enclosing the fan, the casing being provided with an inlet and a discharge outlet for the cut crop. There is a suction conduit connected to the fan inlet, this suction conduit being provided with a mouth having a base portion which causes air and cut crop to be induced together substantially horizontally into the mouth of the conduit. This horizontally directed intake avoids the induction of soil along with the cut crop. There is at least one plate-like cutter member overlapping at least in part the base portion of the mouth of the suction conduit so that the crop is cut and drawn into the mouth of the conduit effectively in a single operation. The induction of soil along with the crop is thus minimized, and grass cut by the cutter or cutters will be thrown into the mouth of the conduit and discharged through the outlet.

In accordance with another feature of the invention, beating or lacerating means are disposed in the casing and driven along with the fan so that, when the cut crop is discharged through the casing outlet, it will be in a lacerated condition suitable for rapid response to subsequent bacteriological treatment in the presence of a minimum quantity of undesirable soil-borne bacteria.

In order that the invention may be clearly understood and readily carried into effect drawings are appended herewith illustrating an embodiment thereof and wherein:

Figures 1, 2 and 3 are front elevation, plan, and side elevation views respectively.

Figure 4 is a front elevation view of the beater device and

Figure 5 is a sectional side elevational view of Figure 4.

Referring to the drawings the frame of the machine is of substantially rectangular form composed of longitudinal channel or other suitable section main frame members 1, 2 and 3 bridged by aft, median and front members 4, 5 and 6 respectively, the front member 6 conveniently being bent from the side member 1 and extended diagonally across the front ends of the longitudinal members 2 and 3 and extended as at 6a beyond the side member 3 to form with it and the member 3 and also a diagonal member 7, a triangulated support for a tow-bar bracket 8 and partial support for bearers 9 for a pair of journal bearings 10 of a shaft 11 and journal bearings 12 of a shaft 13. The pivoted triangular tow bracket 8 is for anchoring the machine to a tractor for towing the machine, the frame being supported otherwise by a pair of land wheels 14 supported by a pair of stub axles 15 carried by plates 16 welded to the cross member 5 and bolted to the frame members 1 and 2. The stub axles are preferably bolted to the plates 16 and the latter have each a plurality of sets of bolt holes to afford up and down adjustment of the stub axles relatively to the frame to cooperate with the adjustment up and down of cutters 22 and 23 hereinafter described. Supported substantially in line with the left hand land wheel 14 is a front caster wheel 17 the column of which is journalled in a vertical sleeve 18 which can be raised and lowered by rotation of a hand crank 19 as hereinafter described.

The front caster wheel has its vertical stub axle journalled in horizontal lugs of a vertical bracket for swivelling, and the said bracket has associated therewith screw feed means for adjusting the wheel relative to the frame for the purpose of ensuring that rotary cutting means hereinafter described is related properly to the ground or set to the desired depth of cut of grass or the like to be harvested and treated.

Obviously many other forms of mobile frame are possible, and I therefore think it unnecessary to describe the present frame in detail.

Suitable beating or lacerating means such as the rotary beater generally indicated by the reference numeral 20 is supported readily detachably by the rear and median transverse frame members 4 and 5 and grass or other fodder is fed to the rotary beater as it is cut by the machine during the travel of the machine along the ground, a conduit generally indicated by the reference numeral 21 guiding the cut grass to the beater from a pair of rotary cutters 22 and 23 located at the front end of the conduit 21. Looking at Figure 2, the cutter 22 rotates anti-clockwise and the cutter 23 clockwise.

The said cutters are so related as to sever the grass whilst at the same time having a lacerating effect upon the grass and so related to the beating means 20 as to form a complete apparatus for treating the grass or the like. That is to say the rotary cutters rotate at a high speed and as they cut the grass close to the ground they operate to converge and fling the cut grass into the mouth of the front or inlet end of the conduit 21 where under the influence of the high velocity draught induced by the combined fan and lacerating means 20 the grass is drawn rapidly into the combined means 20 which subjects the strands of grass to a severe impact action so as to flatten the strands and or lacerate their structure so that juices or moisture therein will be freed to mingle with the flattened strands without loss of such juices which have a high nutriment value.

Each said cutter is a sheet metal or metal alloy plate 24 of substantially square form and disposed normally in a horizontal plane and has fixed to each of its four corners a radially projecting cutter member in the form of a bevel edged triangular steel knife blade 25, the apices of the four blades projecting radially outwards from the axis of rotation of the plate and providing cutting edges. Preferably, the said plate is composed of a metal alloy, e. g. that known under the registered trademark "Dural," which will flex or yield sufficiently to normal impact and irregularities of the ground without acquiring permanent deformation or fracturing.

The two rotary cutter members are fixed to the lower ends of vertical shafts journalled in bearings disposed in sleeves 26 and 27 fixed to the diagonal front frame member 6 opposite sides of the mouth of the conduit 21 so that the axis of rotation of the cutter 23 is in advance of the axis of rotation of the cutter 22. Thus the axes of the two shafts are located on a line diagonal with respect to the frame (see Figure 2), the peripheries of the two cutter blades being close to each other but arranged so as not to foul each other during their rotation, the cutter blades travelling in directions such that they tend to meet each other as they move into the mouth of the conduit 21. At the latter mentioned zone of the cutters the mouth end of the conduit 21 is forwardly flared, e. g. by inclining outwardly part of at least one side wall 21c of the conduit as at 21a and curling the front end of the top wall of the conduit by a substantial semi-circular section flange-like portion 21b upwardly over the front and top of the diagonal front frame member 6, this curled flange being secured to the member 6 by studs not shown.

The rotary blades during part of their rotation pass into the mouth of the conduit 21 moving in the same direction as the air flow in the conduit induced by the fan and lacerator 20 and for this purpose the conduit has a horizontal base plate portion 29 (see Figure 3) located close to the ground and narrowly spaced from the lower edges 30 of the side walls 21c of the conduit to afford both sides gaps 31 to receive the cutters, this arrangement also having the advantages of avoiding clogging of the cut grass against the side walls and of the base plate 29 itself having a certain amount of resiliency which will enable it to yield to a limited extent in the event of its striking an obstruction close to the ground. The location of the cutters in intimate association with the mouth of the conduit 21 and partially overlapping the base plate portion 29 ensures the positive delivery of the cut grass or the like into the mouth of the conduit, whilst as the travel of the two blades across the base plate 29 in the mouth of the conduit has the effect of initially beating the cut grass and somewhat spreading the strands of the grass before it is drawn further along the conduit into the means 20 for subjecting the grass to a final beating or lacerating action. That is to say the grass or the like is to a certain extent lacerated by the rotating cutters and also is prevented from curling up into bundles so that all of the strands as they pass into the beating means 20 are drawn lengthwise into the combined means 20 and consequently will receive the maximum beating or lacerating action to break down their cells to free the juices therefrom, so that in effect they bleed their juices. This is of great importance where the treated grass is to be stored in a silo for food, as the freed juices will remain with the lacerated or ruptured strands and considerably increase certain desirable bacteriological growth after harvesting and thus enhance the food value thereof.

The said beating or lacerating means 20 (see Figures 4 and 5) can comprise a substantially cylindrical casing 31 open at one side and closed at the other side, the closed side 32 receiving a relatively fixed sleeve 33 extending in the axial direction for a part of the depth of the casing and also rearwardly and accommodating within its fore-and-aft ends journal bearings 34 for a concentric shaft 35 to the rear end of which is affixed beyond the said sleeve a pulley 36 driven by a belt 37, a lock nut 35a being threaded on to the rear end of the shaft and abutting against the concentric annular part of the pulley. The annular space 38 between the sleeve and shaft can be filled with grease through a greasing or lubricating hole normally sealed by a hexagonal headed screw 39 or by a lubricator, and a distance piece tube 40 can be fitted about the shaft and extend between the two end sets of journal bearings, oil seal rings 41 being interposed between the journal bearings and the ends of the said sleeve preferably in conjunction with seal collars fitted on the appropriate parts of the shaft.

The forward end of the shaft 35 is threaded as at 42 and has fixed thereon a rectangular collar 43 by means of a nut 44 threaded on to this end of the shaft, and to the four sides of this collar are welded four blades 45 comprising a combined fan and beater. Each blade 45 has a fore-and-aft dimension "A" (see Figure 5) substantially equal to the axial dimension of the cylindrical casing and is formed with a flat portion 45a lying along the appropriate side of the rectangular collar 43 and welded thereto, the width "A" of each blade at its free end being greater than at its inner end by forwardly inclining the front edge 45b of each blade, and each blade is deformed by bending it through an angle of about 30° along a line 45c substantially co-planar with the appropriate side of the collar 43 to which the blade is welded, this deformation imparting a form of pitch to each blade, and the deformed parts being radiused at its free edge as at 45d so that throughout the whole radius thereof the blades are equidistantly spaced from the axis of the shaft 35.

The front wall of the casing has a forwardly directed ring-like inlet mouth part 46 concentric with the shaft 35 and into which mouth part the grass or the like is drawn by the induced draught set up by the combined fan and beater or lacerator 20. This forwardly directed mouth part 46 is eccentric with respect to the casing 31, the periphery of the casing merging at about the point B (see Figure 4) into the radius of the ring 46 and therefrom progressively increasing in radius until it merges into one side 47a of a discharge conduit 47 projecting upwardly from the casing, the opposite side 47b of this conduit joining the smallest radius part B of the curved periphery of the casing, so that the casing takes the form frequently adopted for a "cyclone" type of blower. Thus, by reason of the inclination of the side 47a of the conduit 47 a somewhat flared increase in area of outlet from the casing is provided.

By means of the present invention the grass or the like induced by a forced draught within the casing is caused to pass directly between the beater blades 45 and the wall of the casing 31 and consequently to assume positions in which they extend lengthwise around the ambient space between the rotary beater and the casing so as to become adequately crushed and operated upon at a speed directly proportional to the velocity at which the grass or the like passes into and out from the casing. From this will be appreciated the value of the aforesaid action of the rotary cutters on the grass as it is drawn into the mouth of the conduit 21, apart from the great advantage of treating the grass in the manner described as it is harvested, rather than to adopt the customary method of cutting the grass and leaving it loose in a field before it is harvested this generally resulting in the cut grass drying out or rotting before it is treated, and in most cases requiring the addition thereto of molasses or other foreign agents to render it digestible when in the silo.

The mouth bounded by the ring 46 in the front wall of the casing 31 has detachably secured to it the rear end of the flared conduit 21, the rear part of this conduit preferably having a substantially rectangular cross-section and including at its upper side a hinged flap 48 normally held closed by a spring loaded cross rod 49, this pivoted flap being secured to or abutted against the ring 46. Thus, for example, where required, material can be fed directly through the opening afforded by lifting the said flap or upper wall when it is not required to subject crops or the like to the action of the rotary cutters or alternatively where the machine is held stationary and the material to be treated fed thereinto from a stack.

The cross-sectional area of the rectangular section conduit at the end opposed to the ring 46 of the rotary beater includes as much as possible of the mouth of the beater and its periphery is bounded by a plate 50 abutted against the rim of the ring 46 and secured by a bolt 51, the head 52 of which is bored to receive a bolt 53 passed through a pair of lugs 54 integral with the upper ends of two rods 55 which combine to form an inverted U-shaped clamp for securing the beater 20 to the median frame member 5, the lower ends of this clamp passing through the upper flange of the member 5 and having nuts threaded thereon to draw the inverted U shaped clamp into position, the bolt 53 drawing the opposed upper ends of the rods 55 together to complete the clamping action. The lower corners of the plate 50 have lugs bent off therefrom and are apertured to receive the rods 55.

A guard rail 56 extends across the frame in advance of the rotary cutters and this combined with the partial overhang of the cutters by the conduit 21 affords ample protection against injury of workers.

Means for raising and lowering of the plane of the cutters and the base of the conduit relatively to the ground by means of the handle 19 is provided by fixing the handle 19 to the upper end of a feed screw 57 which at its unthreaded upper end is journalled in a bearing on a bracket 58 welded to the top of the sleeve 18 which passes freely through circular holes in plates 59 and 60 fixed to the upper and lower ends of a channel member 61 in which is fixed a nut through which the screw 57 screws, the plates 59 and 60 together with the member 61 being fixed relatively to the frame of the machine by struts 62 and by extending and affixing the plate 60 to the front frame member 6 (see Figure 2).

The rear of the beater 20 is secured by a pair of inverted U bolts 63 to the rear frame member 4, these bolts engaging over the sleeve 33, the belt 37 driving the adjacent pulley 36 also passing over a pulley 64 on the rear end of a shaft 65 having a universal joint connection 66 to the shaft 11 which is driven via chain wheels 67, 68 and chain 69 from the input shaft 70 coupled to a prime mover such as a shaft on the tractor drawing the machine over the ground. The shaft 11 also carries two pulleys 71 and 72 over which pass belts 73 and 74 carried over pulleys 75 and 76 fixed to the upper ends of shafts rotating in the sleeves 26 and 27 and carrying the cutters. A tow bar 77 is fixed to the rear end of the frame to enable a cart to be trailed behind the machine to receive the treated grass discharged through the conduit 47 and a pipe attached to and extending upwards and rearwards from such outlet.

As shown in the drawing, and more particularly in Figures 1, 2 and 3 thereof, the two oppositely rotatable and substantially square cutter members 22 and 23 overlap at least in part the base portion 29 of the inlet to the conduit 21. The vertical rotational axes of the cutter members 22 and 23, as shown, lie in a plane which makes an acute angle with the longitudinal or fore and aft axis of the mobile frame of the harvester. The cutter members 22 and 23 comprise co-operating portions which are disposed in the mouth of the conduit 21 and which move the cut crop in the same direction as the air flow induced by the combined fan and lacerating means 20. The axes of the shafts for the cutter members are disposed adjacent the longitudinal walls of the flared end of the conduit 21 leading to the rotary beater housing 31, the said rotary cutters not only sever the grass and direct it into the conduit 21 towards the rotary beater but act to a large extent to lacerate the grass so that the transportable machine can be regarded as embodying grass lacerating and beating means constituted by a general housing assembly in the form of a cylindrical part accommodating the rotary beater and the forwardly directed extension thereof in the form of the said conduit 21 having disposed at its mouth end the closely related rotary cutters in the form of substantially horizontal plates having lacerating and cutting teeth in the form of the said triangular corner extensions united thereto, the whole being carried by a mobile frame adapted to be towed by a tractor or other suitable means.

I claim:

1. A harvester comprising a mobile frame, a rotary fan on said frame, a casing enclosing said fan, said casing having an inlet and a discharge outlet, a conduit connected to said inlet, said conduit having a mouth provided with a base portion, and a pair of oppositely rotatable substantially coplanar plate-like cutter members overlapping at least in part said base portion, whereby when grass is cut by said cutter members the same will be thrown into said mouth and discharged through said outlet.

2. A harvester comprising a mobile frame, a rotary fan on said frame, a casing enclosing said fan, said casing having an inlet and a discharge outlet, lacerating means disposed in said casing and driven with said fan, a conduit connected to said inlet, said conduit having a mouth provided with a base portion, and a pair of oppositely rotatable substantially coplanar plate-like cutter members overlapping at least in part said base portion, whereby when grass is cut by said cutter members the same will be thrown into said mouth and discharged through said outlet in a lacerated condition.

3. A harvester comprising a mobile frame having a longitudinal axis, a rotary fan on said frame, a casing enclosing said fan, said casing having an inlet and a discharge outlet, a conduit connected to said inlet, said conduit having a mouth provided with a base portion, and a pair of oppositely rotatable substantially coplanar plate-like cutter members overlapping at least in part said base portion, the rotational axes of said cutter members lying in a plane which makes an acute angle with said longitudinal axis, whereby when grass is cut by said cutter members the same will be thrown into said mouth and discharged through said outlet.

4. A harvester comprising a mobile frame, a rotary fan on said frame, a casing enclosing said fan, said casing having an inlet and a discharge outlet, a conduit connected to said inlet, said conduit having a mouth provided with a base portion, and a pair of oppositely rotatable substantially coplanar plate-like cutter members overlapping at least in part said base portion, said cutter members comprising cooperating portions disposed within said mouth for movement in the same direction as the air flow through said conduit induced by said fan, whereby when grass is cut by said cutter members the same will be thrown into said mouth and discharged through said outlet.

5. A harvester comprising a mobile frame having a longitudinal axis, a rotary fan on said frame, a casing enclosing said fan, said casing having an inlet and a discharge outlet, lacerating means disposed in said casing and driven with said fan, a conduit connected to said inlet, said conduit having a mouth provided with a base portion, and a pair of oppositely rotatable substantially coplanar plate-like cutter members overlapping at least in part said base portion, the rotational axes of said cutter members lying in a plane which makes an acute angle with said longitudinal axis, whereby when grass is cut by said cutter members the same will be thrown into said mouth and discharged through said outlet in a lacerated condition.

6. A harvester comprising a mobile frame, a rotary fan on said frame, a casing enclosing said fan, said casing having an inlet and a discharge outlet, lacerating means disposed in said casing and driven with said fan, a conduit connected to said inlet, said conduit having a mouth provided with a base portion, and a pair of oppositely rotatable substantially coplanar plate-like cutter members overlapping at least in part said base portion, said cutter members comprising cooperating portions disposed within said mouth for movement in the same direction as the air flow through said conduit induced by said fan, whereby when grass is cut by said cutter members the same will be thrown into said mouth and discharged through said outlet in a lacerated condition.

7. A harvester comprising a mobile frame having a longitudinal axis, a rotary fan on said frame, a casing enclosing said fan, said casing having an inlet and a discharge outlet, lacerating means disposed in said casing and driven with said fan, a conduit connected to said inlet, said conduit having a mouth provided with a base portion, and a pair of oppositely rotatable substantially coplanar plate-like cutter members overlapping at least in part said base portion, said cutter members comprising cooperating portions disposed within said mouth for movement in the same direction as the air flow through said conduit induced by said fan, the rotational axes of said cutter members lying in a plane which makes an acute angle with said longitudinal axis, whereby when grass is cut by said cutter members the same will be thrown into said mouth and discharged through said outlet in a lacerated condition.

8. A harvester comprising a mobile frame having a longitudinal axis, a rotary fan on said frame, a casing enclosing said fan, said casing having an inlet and a discharge outlet, lacerating means formed integrally with said fan and disposed in said casing, a conduit connected to said inlet, said conduit having a mouth provided with a base portion, a pair of oppositely rotatable substantially coplanar plate-like cutter members overlapping at least in part said base portion, the rotational axes of said cutter members lying in a plane which makes an acute angle with said longitudinal axis, said cutter members comprising cooperating portions disposed within said mouth for movement in the same direction as the air flow through said conduit induced by said fan, whereby when grass is cut by said cutter members the same will be thrown into said mouth and discharged through said outlet in a lacerated condition.

9. A harvester comprising a mobile frame, a rotary fan on said frame, a casing enclosing said fan, said casing having an inlet and discharge outlet, a conduit connecting to said inlet, said conduit having a mouth provided with a base portion, and at least one rotatable plate-like cutter member substantially co-planar with and overlapping at least in part said base portion, whereby when grass is cut by said cutter member the same will be thrown into said mouth and discharged through said outlet.

10. A harvester comprising a mobile frame, a rotary fan on said frame, a casing enclosing said fan, said casing having an inlet and discharge outlet, lacerating means disposed in said casing and driven with said fan, a conduit connected to said inlet, such conduit having a mouth provided with a base portion, vertical shafting adapted to be driven by power operated means, rotary crop cutting knives radiating from said shafting and being substantially co-planar with and overlapping at least in part said base portion whereby when said grass is cut by said cutter knives the same will be thrown into said mouth, sucked by said fan into said housing and lacerated by said lacerating means and discharged through said outlet in a lacerated condition.

References Cited in the file of this patent

UNITED STATES PATENTS

| | | |
|---|---|---|
| 2,474,557 | Templeton | June 28, 1949 |
| 2,629,218 | Smith | Feb. 24, 1953 |